United States Patent Office 3,133,822
Patented May 19, 1964

3,133,822
METHODS OF MAKING LIGHT WEIGHT HEAT INSULATING BLOCKS
Josef Wuhrer, Wulfrath, Rhineland, and Frederick Bischoff, Hagen, Westphalia, Germany, assignors to Dolomitwerke G.m.b.H., Wulfrath, Rhineland, Germany, a corporation of Germany
No Drawing. Filed July 21, 1961, Ser. No. 125,664
Claims priority, application Germany July 25, 1960
5 Claims. (Cl. 106—87)

To decrease the loss of heat in industrial furnaces, heat insulating and sufficiently fireproof insulating or light weight blocks are inserted, usually as a back-wall construction. Should sintered dolomite brick be used as a working lining in order to provide a basic coating capable of withstanding a high temperature, such are suitable for instance in steel-, lime-, and cement-furnaces, then, as a heat insulating layer, lying behind such working lining, basic light weight blocks are best suited to avoid undesirable chemical reactions with the sintered dolomite on the contact surface. Of course, most successful are light weight blocks of a material of the same kind, that is dolomite itself.

It has been suggested, although not yet in technological use, that such dolomite light-weight blocks may be produced from ground, stabilized and hydraulically setting sintered dolomite, by simply pre-mixing it with water to form a plastic, to a thinly liquid pulp, adding a pore-producing material, such as aluminum or magnesium powder, or foam-producing substance, such as a resin soap, whereby gas or air pores are produced, and then permitting the mass hydraulically to harden in molds. Such dolomite light-weight blocks are good heat insulators and are resistant to high temperatures, with a melting point above 1900° C. However, a serious disadvantage is their tendency to shrink and to form cracks, especially at temperatures above 1100° C.

The present invention is concerned with an improvement of such dolomite light-weight blocks, especially regarding the shrinkage and fissuring as mentioned. According to the invention the porous molded bodies of dolomite, as described above, after a more or less complete hydraulic setting are submitted to a burning or tempering process desirably above 1200° C. or, even better, above 1400° C. In this connection it is of advantage to choose not too large a size for the molded bodies of dolomite, or to break them in advance, in order to facilitate uniform shrinkage throughout during the tempering process. The pieces desirably should be smaller than 200 mm. and even better smaller than 100 mm. The tempering process may be satisfactorily carried out, for instance, by passing such pieces through a tunnel furnace for several hours, as a rule between five and forty hours, depending on size and temperature. During this process each single piece will shrink, but an agglomeration of them will be avoided.

From such tempered material, new molded bodies of any preferred size can be produced, preferably again by using finely ground, stabilized and hydraulically setting sintered dolomite, in the regular way, just as in the case of regular concrete. After their hydraulic hardening these new molded bodies can be directly installed as heat insulating dolomite light-weight blocks, for instance, behind the basic working lining.

Dolomite light-weight blocks, produced in this way, have only a very minor shrinkage and even under high temperatures no disturbing cracks will occur, even more so if the brick have been well shaken or rammed down.

Just as in the production of the usual cement-bound single-grain concrete, or of concrete with any desired grain aggregate in the admixture, so here also light-weight blocks can be produced of mostly single-grain tempered material or of one with any kind of grain combination.

The following examples are given by way of illustrating our invention, viz.

*Example 1.*—Sintered dolomite, stabilized with silicic acid and hydraulically setting, and sufficiently ground to provide a 4% residue on the 4900-mesh screen, was prepared as a plastic and as a thin liquid pulp by adding a sufficient amount of water. Then, as it is done during the production of air entraining concrete, aluminum powder was added as a gas producing agent (0.2% by weight in relation to the ground sintered dolomite).

This powder was quickly and intensively intermixed, whereupon the preparation was cast into molds in which the pulp was expanded by the generation of gas. After a hydraulic hardening of three days, the resulting molded body was taken from the shell, then broken into granules having a particle size no larger than 30 mm., and this broken material was tempered for fifteen hours in a tunnel furnace which reached approximately 1500° C. in its hot zone. From the resulting well-hardened granulated material, the grain 7–15 mm. was sifted off. From the latter molded bodies were then produced by adding water and 20% by weight of sintered dolomite, ground as finely as Portland cement, for example, with a 4% residue on the 4900-mesh screen, stabilized and hydraulically setting. By shaking such mixture the grains were brought into close relation with each other. After a hydraulic hardening of seven days, a resistance to cold pressure of 40 kg./cm.$^2$ was observed with a volumetric weight (bulk density) of 0.9 kg./ltr. The linear shrinkage was 1.8% with a temperature of 1500° C.

*Example 2.*—By cautious stamping molded bodies were produced in the same way from the unsifted granulation which had a particle size no larger than 30 mm. after a temperature treatment in the tunnel furnace, again with a 20% addition of the before mentioned hydraulic binder. These molded bodies had a more compact structure and the volumetric weight was 1.4 kg./ltr. After a hydraulic hardening of seven days the density was around 85 kg./cm.$^2$. The shrinkage amounted to 2.2%.

It should be added that in defining the preferred fineness of the sintered dolomite employed in the foregoing examples as 4900-mesh, this is according to the conventional European scale. The equivalent Tyler Standard screen size generally used in the United States would be approximately 170 mesh, corresponding with an 0.0035 in. opening.

Other modes of applying the principle of the invention may be employed, change being made as regards the details described, provided the means, the steps of the method or the characteristics of the product stated in any of the following claims, or the equivalent of such, be employed.

We therefore particularly point out and distinctly claim as my invention:

1. A method of producing a light-weight, heat insulating body having a reduced tendency to shrink and form cracks comprising the steps of admixing stabilized sintered hydraulically settable dolomite, at least 96 percent by weight of which passes a Tyler Standard screen size of 170, with sufficient water to form castable hydraulically settable pulp and with a metallic pore-producing agent selected from the group consisting of aluminum and magnesium present in an amount sufficient to effect expansion of the sintered dolomite, casting the resulting aqueous admixture in molds, expanding the admixture by the generation of gas from such agent and hydraulically setting the stabilized sintered dolomite in a hardened porous form, comminuting the hydraulically set porous form into granules no larger than 200 mm., heating such granules to a temperature within the range of about 1200° C. to about 1500° C. for about 5 to about 40 hours to shrink the granules, removing from the shrunk granules those having a grain size approximately within the range of about 7 mm. to about 15 mm., admixing with a bonding amount of fresh non-expanded stabilized sintered hydraulically-settable dolomite sufficient of said removed granules to provide in the resulting admixture a reduced tendency to shrink and crack when hydraulically set, then adding a sufficient amount of water to effect hydraulical setting of the dolomite, and finally hydraulically setting said dolomite with the water to form such heat insulating body.

2. A method of producing a light-weight, heat insulating body having a reduced tendency to shrink and form cracks comprising the steps of admixing stabilized sintered hydraulically settable dolomite with sufficient water to form a hydraulically-settable pulp and with a sufficient amount of a vaporizable metallic gas-producing agent to effect expansion of such sintered dolomite to a porous form, molding the admixture, expanding the admixture by the generation of gas from such agent to such porous form and hydraulically setting the resulting stabilized sintered porous dolomite, granulating the set sintered porous dolomite, heating the resulting granules to a temperature within a range of about 1200° C. to about 1500° C. for about 5 to about 40 hours to shrink the granules, admixing a bonding amount of fresh non-expanded stabilized sintered hydraulically-settable dolomite sufficient of said shrunk granules to provide in the resulting admixture a reduced tendency to shrink and crack when hydraulically set, and finally adding to these admixed granules sufficient water hydraulically to set the admixture and form such heat insulating body.

3. A method of producing a light-weight, heat insulating body having a reduced tendency to shrink and form cracks comprising the steps of admixing stabilized sintered hydraulically-settable dolomite with sufficient water to form a hydraulically-settable pulp and with a sufficient amount of a vaporizable gas-producing agent to effect expansion of said sintered dolomite to a porous form, expanding the admixture by the generation of gas from such agent to such porous form and hydraulically setting the resulting stabilized sintered porous dolomite, granulating the set sintered porous dolomite, heating the resulting granules to a temperature within a range of about 1200° C. to about 1500° C. for about 5 to about 40 hours to shrink the granules, admixing with at least a bonding amount of non-expanded stabilized sintered hydraulically settable dolomite sufficient of said shrunk granules to provide in the resulting admixture a reduced tendency to shrink and crack when hydraulically set, and finally adding to the admixed granules sufficient water hydraulically to set said granules and form the heat insulating body.

4. The method of claim 3 wherein the porous hydraulically set, sintered dolomite granules are smaller than 200 mm.

5. The method of claim 3 wherein the porous, hydraulically set sintered dolomite is reduced to granules of approximately 7 to 15 mm. before being heated, and such unshrunk granules comprise about 20 percent by weight of the admixture.

References Cited in the file of this patent

UNITED STATES PATENTS

| | | |
|---|---|---|
| 1,063,102 | Baker | May 27, 1913 |
| 1,994,377 | Williams et al. | Mar. 12, 1935 |
| 2,131,374 | Grunwald | Sept. 27, 1938 |
| 2,663,647 | Huntzicker | Dec. 22, 1953 |